No. 886,506. PATENTED MAY 5, 1908.
H. K. HOLSMAN.
AUTOMOBILE.
APPLICATION FILED FEB. 8, 1907.
4 SHEETS—SHEET 2.
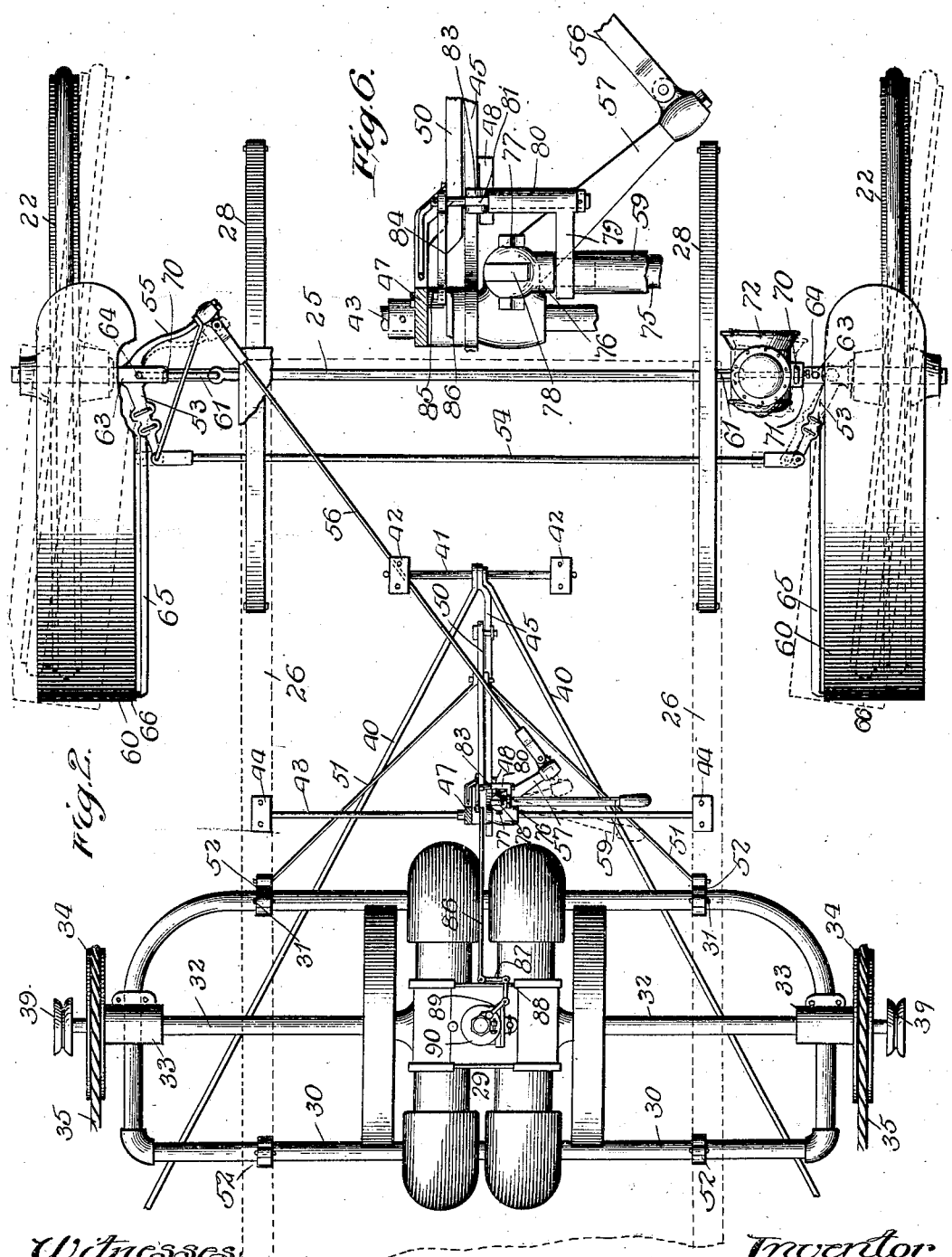

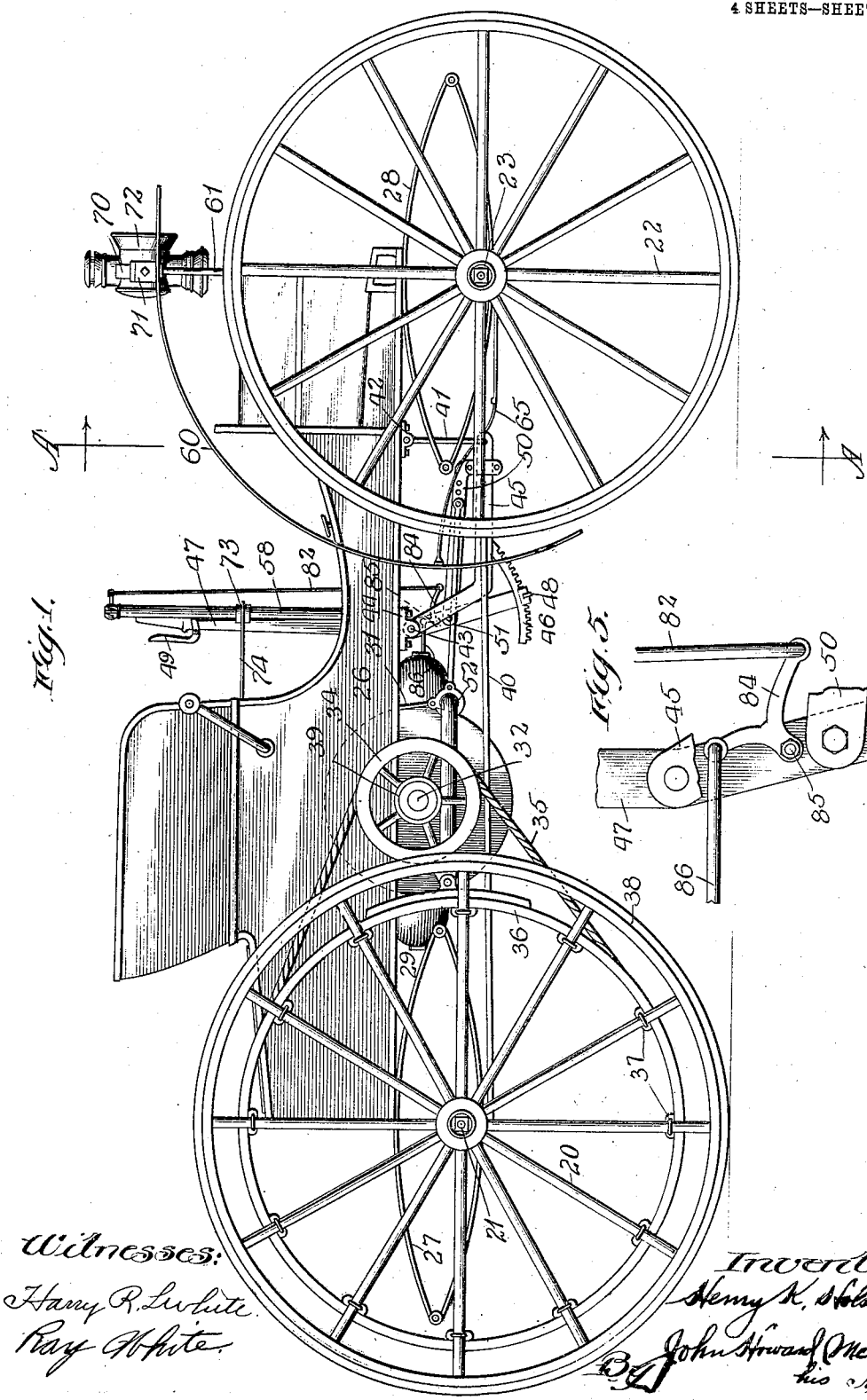

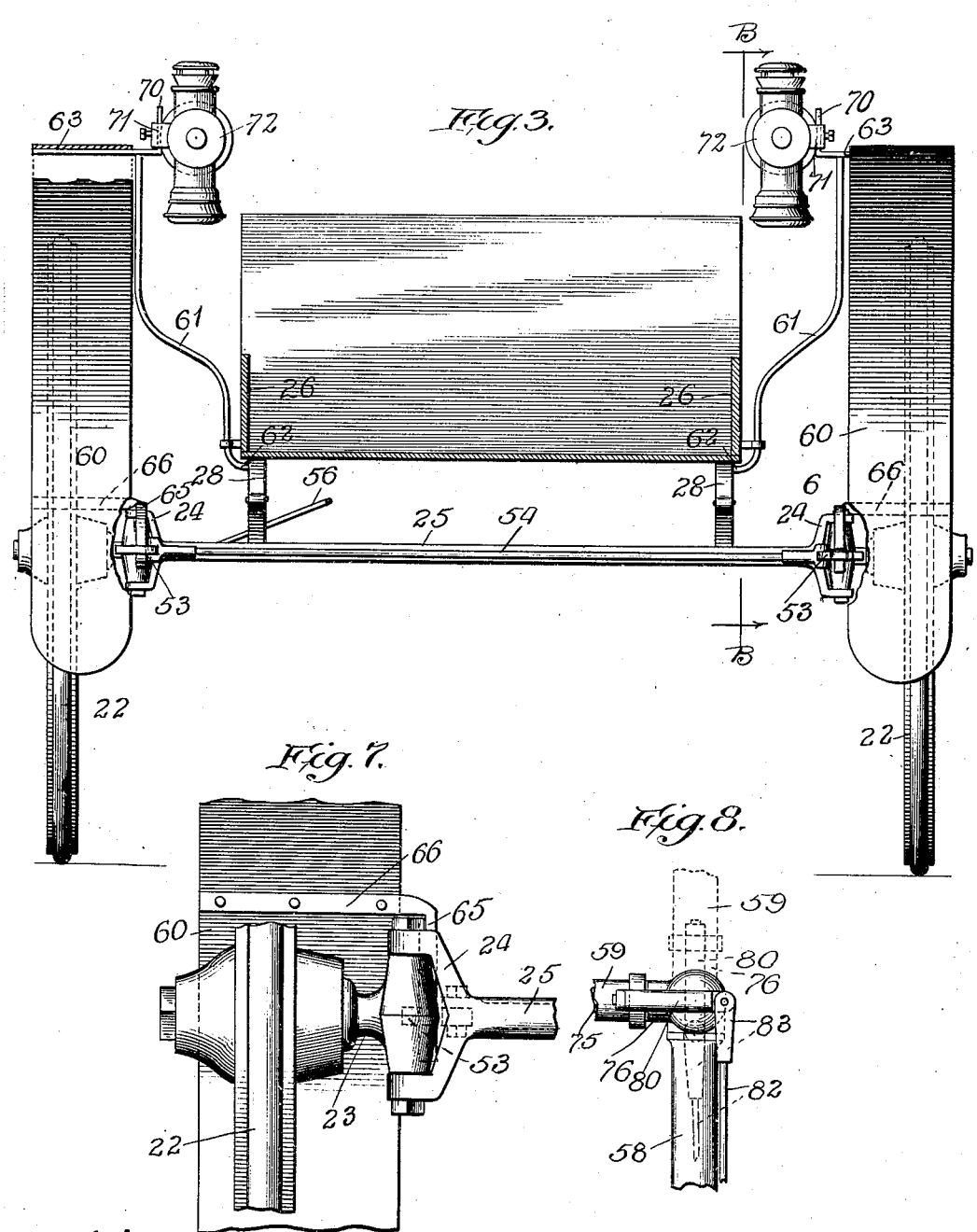

No. 886,506. PATENTED MAY 5, 1908.
H. K. HOLSMAN.
AUTOMOBILE.
APPLICATION FILED FEB. 8, 1907.
4 SHEETS—SHEET 4.
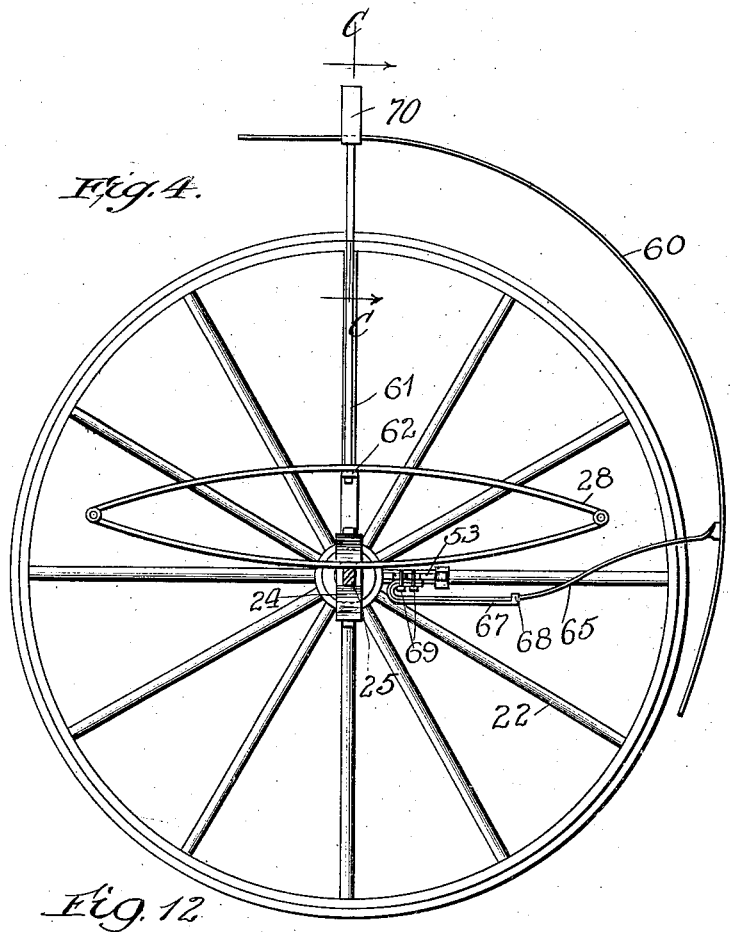
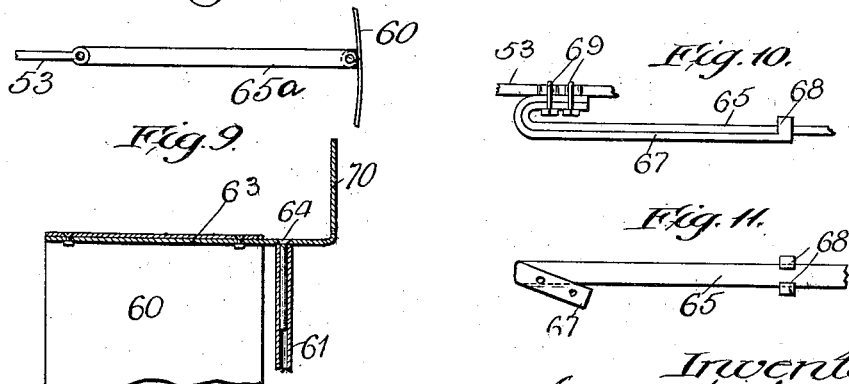
Witnesses:
Harry R. White
Ray White
Inventor:
Henry K. Holsman,
By John Howard McElroy,
his Atty.

UNITED STATES PATENT OFFICE.

HENRY K. HOLSMAN, OF CHICAGO, ILLINOIS.

AUTOMOBILE.

No. 886,506.            Specification of Letters Patent.          Patented May 5, 1908.

Application filed February 8, 1907. Serial No. 356,393.

*To all whom it may concern:*

Be it known that I, HENRY K. HOLSMAN, a citizen of the United States, and resident of Chicago, in the county of Cook and State of Illinois, have invented certain new and useful Improvements in Automobiles, of which the following is a full, clear, and exact specification.

My invention is concerned with improvements in the connection of any of the parts to the automobile that should swing with the steering wheels, such as the fenders of the steering wheels, or the lamps to illuminate the road so that the said parts will turn at the same angles as the steering wheels to protect the occupants or to properly illuminate the road, as the case may be.

To illustrate my invention, I have annexed hereto four sheets of drawings, in which the same reference characters are used to designate identical parts in all the figures, of which,—

Figure 1 is a side elevation of an automobile containing my invention; Fig. 2 is a plan view of the forward portion of the running gears thereof, with the engine in place; Fig. 3 is an elevation, on an enlarged scale, on the line A—A of Fig. 1; Fig. 4 is an elevation, in section, on the line B—B of Fig. 3; Fig. 5 (Sheet 1) is an enlarged detail of part of the mechanism shown in Fig. 1, with a portion of the connecting link broken away to show the bell crank behind it; Fig. 6 (Sheet 2) is an enlarged top plan view of a portion of the mechanism shown in Fig. 2; Fig. 7 is an enlarged detail of one of the steering-wheel hubs and connections, seen from the front of the vehicle; Fig. 8 is a detail showing, in front elevation, the connections between the handle and the steering post proper; Fig. 9 (Sheet 4) is a detail, on an enlarged scale, in section on the line C—C of Fig. 4; Fig. 10 is a side elevation, on an enlarged scale, of a portion of the mechanism shown in Fig. 4; Fig. 11 is a top plan view of the same, and Fig. 12 is a detail of a modification.

While it will be understood that my improvements might be applied to different types of automobiles, I have illustrated them as applied to an automobile of the type shown in my Patent No. 697,720, dated April 15, 1902, and in my companion application, No. 352,848, filed January 1907. In this type of automobiles, the traction wheels 20 are mounted on the rear axle bar 21, and the steering wheels 22 are mounted on the axles 23, which are pivoted in yokes 24 secured on the front axle bar 25, as best shown in Fig. 7. The bed or body 26 of the vehicle is secured at its rear end to springs 27 secured on the rear axle 21, and at its forward end upon springs 28 secured on the front axle bar 25.

I have illustrated the machine as being driven from the engine 29, which is carried by a swinging frame 30, which is pivoted by links 31 to side bars on the bed 26, all as is fully disclosed in the companion application No. 352,848, before referred to. The engine shaft 32 is journaled in bearings 33 carried by the frame 30, and has secured just outside of the bearings, driving pulley-wheels 34, around which pass driving cables 35, which also pass around the driving rim 36 secured to rotate with the traction wheels in any convenient manner, as, for instance, by being secured to the spokes by clips 37. Outside of the pulley wheels 34 and in the plane of the tires 38 of the traction wheels, I secure reversing disks 39, which are adapted to coöperate with the tires and drive the machine backward when the engine is swung from the forward driving position shown in Fig. 1 back until the reversing disks 39 engage the tires.

Of course, it will be understood that the rearward movement of the engine releases the tension on the cable 35 until it does not transmit the rotation of the driving pulley-wheel 34 to the rim 36. The rear axle 21 has secured thereto diagonal distance rods 40, which extend to and are secured at the lower end of a V-shaped link 41, the upper ends of which are journaled in bearings 42 secured to the bottom of the bed. A rock shaft or rod 43 is mounted or secured in bearings 44 carried by the sides of the bed, so that it is capable of springing slightly at the center, and a connecting bar 45 is mounted at its upper end centrally of said rock shaft or rod 43, and has its forward and lower end secured on the link 41 between the ends of the distance rods 40. The connecting bar 45 has secured thereon, or preferably formed integral therewith, a segmental ratchet bar 46 and an operating lever 47, which is secured upon the part 43 if it be a rock shaft, or journaled thereon if it be a rod, and has associated therewith a locking detent dog 48, which may be of any desired construction, and which coöperates with the teeth of the segment 47, being moved out of engagement therewith by the operation of the handle 49. Any desired connections may be employed between the detent 48 and the handle 49, one specific form being shown in my aforesaid companion application No. 352,848. The lever 47 has pivoted thereto a link bar 50, which has a loop at its forward and lower end which slides on the horizontal portion of the connecting bar 45, and this link bar 50, in turn, has pivoted thereto link rods 51, which are connected to the forward pair of collars 52 by which the links 31 are connected to the engine frame. It will be readily apparent from the foregoing description that as the upper end of the operating lever 47 is moved to the rear, or toward the driver, the engine will be shifted so as to tauten the rope 35 and drive the vehicle, and that it can be locked in any position of tension required. As the upper end of the lever is moved in the opposite direction, the engine is moved to the rear, and the tension of the rope 35 slackened to stop the vehicle; and if it is desired to reverse the vehicle, the engine is swung still farther to the rear until the reversing disks 39 engage the tires 38, when the vehicle will be backed slowly. The foregoing part of my invention is fully described and claimed in my aforesaid companion application, No. 352,848.

The axles 23 of the steering wheels 22 are provided at the rear thereof with arms 53, which are connected by a link 54, so that when the arm 55 connected to one of the axles is shifted by means of a link 56, which is pivoted at its other end to the lower arm 57 upon the steering post 58, which has a horizontal handle bar 59 at its upper end, both wheels will be turned simultaneously in the same direction. It is desirable to move the mud guards or fenders 60 for the steering wheels at the same time and to the same extent as the steering wheels are moved, in order that the occupants of the vehicle be protected from mud being thrown upon them while the vehicle is turning, and for this purpose I support the fender 60 in the manner shown, where a rod or tube 61 is secured to the bottom of the body or to the upper portion of the springs 28, as seen at 62, in Fig. 4, and extends upward to the transverse supporting bar 63 upon which the top of the fender is bolted, as seen in Fig. 9. This bar 63 is pivotally mounted on the top of the tube or rod 61, as by a pivot pin 64 extending therethrough into the upper end of the rod. The lower end of the fender is supported by a spring bar 65, which has a transverse portion 66 bolted thereto, as seen in Fig. 7, and which is reinforced at its rear end by a supplemental bar 67, which corresponds in shape thereto and has its rear end secured thereon, as by means of clips 68 bent thereover, as seen in Figs. 10 and 11. The rear ends of these bars 65 and 67 are secured to the arms 53 by clips 69, and the upper engaging portions of these bars 65 and 67 are inclined at an angle to the bodies thereof, as seen in Fig. 11, in order to extend directly in the line of the fenders, despite the inclination of the arms 53 thereto. It will be noted from Fig. 3 that the upper end of the fender is pivoted to the carriage body 26 directly above the pivotal axis of the axle 23 in the yoke 24, and the bar 65 being a spring bar and the tube or rod 61 having a certain amount of spring in it, it will be obvious that the fenders will follow the turning of the wheels in steering, and that their spring connections are such as to permit of the considerable vertical, lesser transverse, and still less longitudinal movement of the bed 26 relative to the running gears.

The inner ends of the bars 63 I turn up to form supports 70 for the yokes 71 of the lamps 72, and inasmuch as these supports 70 are flat and the lamps cannot turn thereon, it will be obvious that the lamps are turned as the steering wheels are turned, thus illuminating the roadway in the direction that the vehicle is turning, and this constitutes a novel and important feature of my invention.

The steering post 58 is shown as journaled in a bearing 73 supported by brackets 74 extending forward from the seat, and is also journaled at its lower end in a bearing (not shown) in the bottom of the bed 26. The handle 59 consists of a sleeve terminating in the handle portion proper and mounted to slide longitudinally upon, as well as rotate upon, a sleeve or rod 75 which is secured upon the hinge member 76, which has the yoke-shaped end, and is pivoted by means of a pin 77 upon the blade hinge member 78 projecting upward from the top of the post 58. The sleeve 59 constituting the handle has secured at its inner end an arm 79 which terminates in an elongated bearing sleeve 80 for the rod 81 secured to rotate therein, and having a connecting link 82 pivoted at its inner end by a yoke 83, as best shown in Figs. 6 and 8. By this construction, it will be apparent that as the handle 59 is rotated, the link 82 will be raised or lowered without in any way interfering with the general direction of the handle which controls the direction of movement of the vehicle. It will also be noted, from Fig. 8, that when the handle 59 is turned to a vertical position, as is customary to get it out of the way when leaving the vehicle, the link 82 is necessarily thrust downward so as to completely throttle the engine, and thus automatically secure its stopping without any further attention on the part of the operator. This feature is advantageous, as the driver automatically stops the engine as he leaves the vehicle, unless he takes pains not to do so by turning the handle 59 upward slightly as he throws it to a vertical position, as he can do, if desired.

The link 82 is pivoted at its lower end to the bell crank 84, which is pivoted at 85 upon the lower end of the operating lever 47, so that the connections swing with said lever as the engine is moved in either direction, and this is a novel feature of my invention applicable to structures where the engine is moved in controlling the driving of the vehicle. If the engine were stationary, of course, it will be understood that the bell crank 84 would be located upon some stationary part of the vehicle. As it is, its other end is connected by a rod 86 with a bell crank 87 pivoted at 88 upon the engine and having its other end connected to a link 89 which operates the throttling mechanism 90, whether the same be for steam or gasolene, although it will be apparent that my invention is especially intended for gasolene engines.

While I have herein shown and described a novel steering handle combined with the engine throttling mechanism so that the same mechanism may be used to steer and control the speed of the vehicle, I do not herein claim this invention, but have claimed the same in my divisional application, No. 378,502, filed June 12th, 1907.

While I have shown and described my invention in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In an automobile, the combination with the running gears, of the steering wheel having its axle pivoted thereon, the body, and the steering-wheel fender partly supported by the steering wheel and partly by the body so as to swing with the wheel.

2. In an automobile, the combination with the running gears, of the steering wheel having its axle pivoted thereon, the body, and the steering-wheel fender pivoted from the body so as to swing with the wheel.

3. In an automobile, the combination with the running gears, of the steering wheel having its axles pivoted thereon, the body, and the steering-wheel fender supported at its upper end by a pivotal connection with the body and at its lower end by a non-pivotal connection with the axle of the steering wheel.

4. In an automobile, the combination with the running gears, of the steering wheel having its axles pivoted thereon, the body, the steering-wheel fender, the rod projecting from the body, pivotal connections between said rod and the upper part of the fender, and a bar rigidly secured to the steering-wheel axle projecting to the bottom of the fender and secured thereto.

5. In an automobile, the combination with the running gears, of the steering wheels, the steering-wheel axle-bar, the steering-wheel axles pivoted thereto, and fenders pivoted at their upper ends to the body above the steering-wheel axle pivot.

6. In an automobile, the combination with the running gears, of the steering wheel having its axle pivoted thereon, the body, the fender pivoted at its upper end to the body above the steering-wheel pivot, and non-pivotal connections between the lower part of the fender and the steering-wheel axle.

7. In an automobile, the combination with the running gears, of the steering-wheel axle pivoted thereon, the steering wheel, the body, the steering-wheel fender pivoted thereto at its upper end above the steering-wheel axle pivot, and non-pivotal connections between the lower end of the fender and the steering-wheel axle.

8. In an automobile, the combination with the running gears, of the steering-wheel axle pivoted thereon, the steering wheel, the body, the steering-wheel fender pivoted thereto at its upper end above the steering-wheel axle pivot, and non-pivotal yielding connections between the lower end of the fender and the steering-wheel axle.

9. In an automobile, the combination with the running gears, of the steering-wheel axle pivoted thereon, the steering wheel, the body, the steering-wheel fender pivoted thereto at its upper end above the steering-wheel axle pivot, and non-pivotal yielding connections between the lower end of the fender and the steering-wheel axle, consisting of a spring bar.

10. In an automobile, the combination with the running gears, of the steering-wheel axle pivoted thereon, the steering wheel, the body, the steering-wheel fender pivoted thereto at its upper end above the steering-wheel axle pivot, and non-pivotal yielding connections between the lower end of the fender and the steering-wheel axle, consisting of a spring bar reinforced at its inner end by a second spring bar.

11. In an automobile, the combination with the running gears, of the steering wheel having its axle pivoted thereon, the body, the fender, and a supporting member also supporting the upper end of the fender, and partly supported by the steering wheel and partly by the body, so as to swing with the wheel.

12. In an automobile, the combination with the running gears, of the steering wheel having its axle pivoted thereon, the body, the fender, and a supporting member also supporting the upper end of the fender and pivoted from the body so as to swing therewith.

13. In an automobile, the combination with the running gears, of the steering wheel having its axle pivoted thereon, the body, the fender, and a supporting member also supporting the upper end of the fender and supported at its upper end by a pivotal connection with the body and at its lower end by a non-pivotal connection with the axle of the steering wheel.

In witness whereof, I have hereunto set my hand and affixed my seal, this 5th day of February, A. D. 1907.

HENRY K. HOLSMAN. [L. S.]

Witnesses:
M. S. REEDER,
JOHN H. McELROY.